Feb. 28, 1967
T. A. McCOY
3,306,473
SEAM LOCATING DEVICE FOR METAL DRUMS
Filed June 14, 1965
2 Sheets-Sheet 1
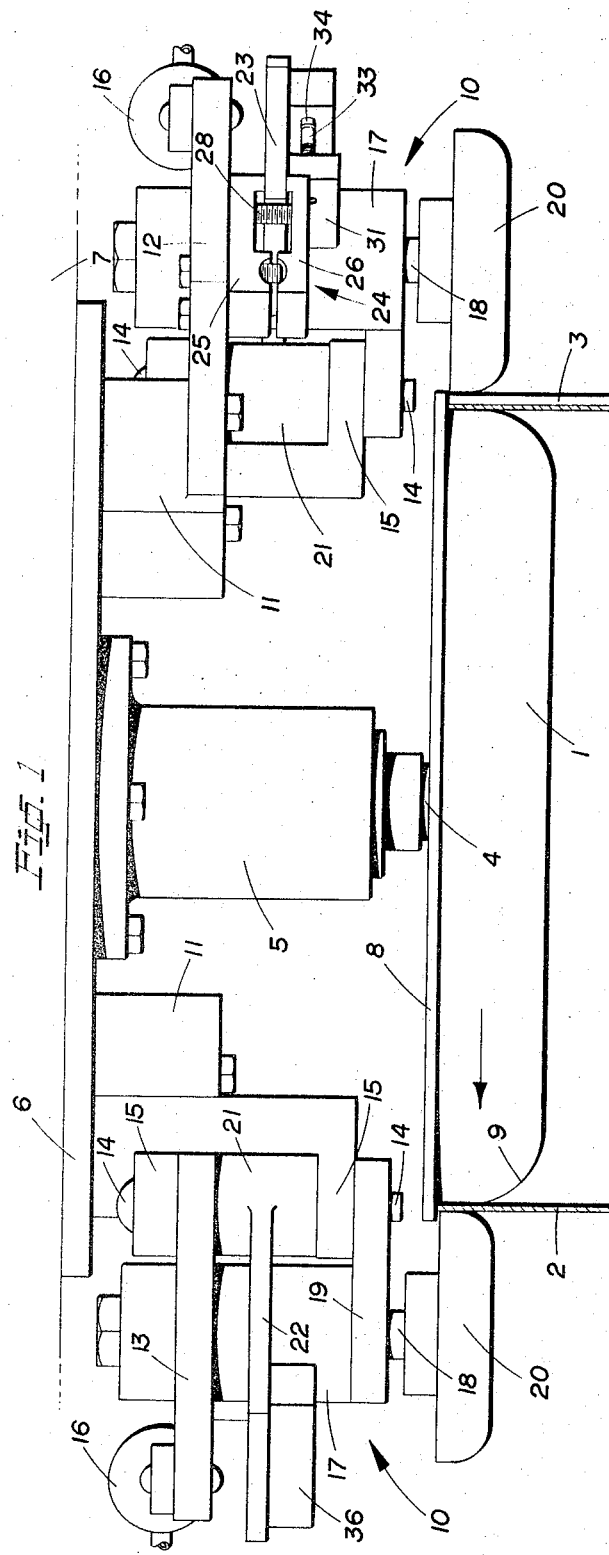
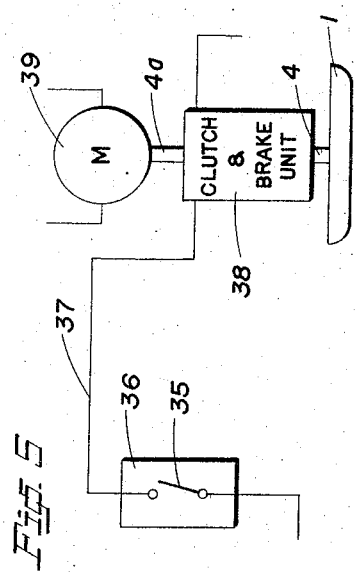
INVENTOR.
Thomas A. McCoy
BY
Webster & Webster
ATTORNEYS

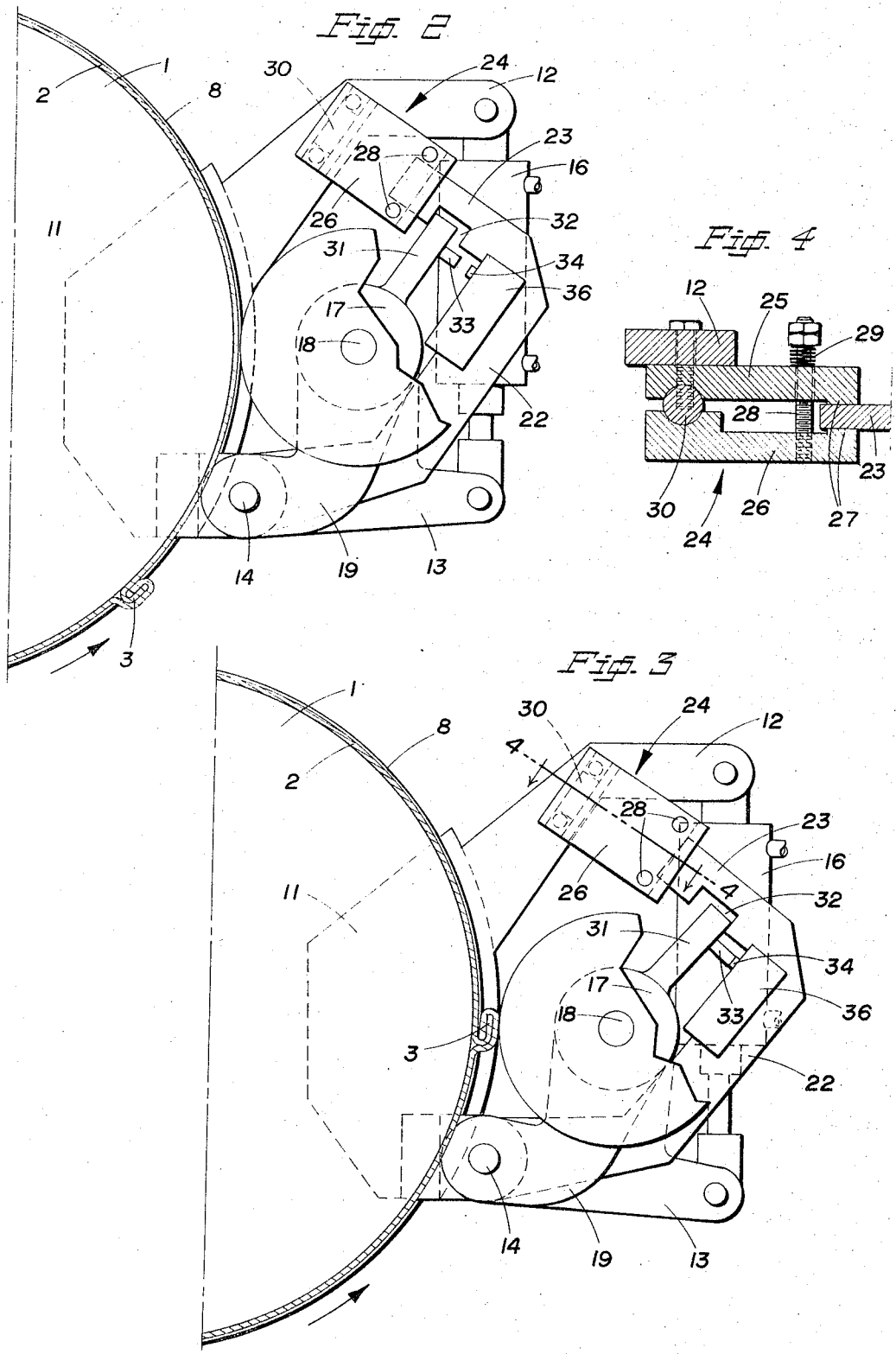

United States Patent Office 3,306,473
Patented Feb. 28, 1967

3,306,473
SEAM LOCATING DEVICE FOR METAL DRUMS
Thomas A. McCoy, Stockton, Calif., assignor to Carando
Machine Works, Stockton, Calif., a partnership
Filed June 14, 1965, Ser. No. 463,795
5 Claims. (Cl. 214—1)

This invention relates to the manufacture of metal drums or similar cylindrical bodies, and is directed particularly to the positioning of the drums on an assembly line conveyor during the manufacturing procedure.

Such drums are made from initially flat sheet metal rolled to the desired cylindrical form and always have a seam where the ends of the sheet are connected together; such seam—unless prelocated—possibly being in the way of operations performed on the drums (such as the application of opposed handle or bail receiving ears) during the progress of the drums by the assembly line conveyor.

Such an assembly line conveyor is shown in United States Patent No. 2,901,085, and the major object of the present invention is to provide a novel device—mounted in association with such an assembly line conveyor and utilizing a feature of said patent—by means of which the seam of each drum will, as the drums are advanced by said conveyor, be automatically located in a certain position relative to the direction of said advance.

The drum seams always present a thickness of metal over and above that of the drums themselves, and such additional thickness is on the outside of the drums.

Another important object of this invention is to provide a seam locating device which is actuated by reason of the seam thickness, and arranged to function regardless of the extent of such thickness and without requiring any adjustments.

An additional object of the invention is to provide a seam locating device for metal drums which is designed for ease and economy of manufacture.

A further object is to provide a seam locating device for metal drums designed for smooth continuous operation at relatively high speed.

A still further object of the invention is to provide a practical, reliable, and durable seam locating device for metal drums and one which is exceedingly effective for the purpose for which it is designed.

These objects are accomplished by means of such structure and relative arrangement of parts as will fully appear by a perusal of the following specification and claims.

In the drawings:

FIG. 1 is a side elevation of the seam locating device, showing the same as engaged with a drum.

FIG. 2 is a fragmentary bottom plan view of the device, showing the engaged drum in a position before the seam thereof is located.

FIG. 3 is a similar view, but showing the seam in a located position. It should be noted that in FIGS. 2 and 3, the seam has been purposely shown in exaggerated form radially in order to better emphasize the operation of the disclosed control unit when seam actuated.

FIG. 4 is a fragmentary enlarged section taken on line 4—4 of FIG. 3.

FIG. 5 is a diagram of the circuit between one control unit and the clutch and brake unit of the device.

Referring now more particularly to the drawings and to the characters of reference marked thereon, the seam locating device which is the subject of this invention comprises a horizontal, circular chuck 1 of a diameter to fit snugly into the open upper end of a drum 2 whose outwardly projecting vertical seam 3 is to be located.

The chuck 1 is mounted on the lower end of a vertical-axis shaft 4 which is journaled in a sleeve 5 depending from and secured on a horizontal plate 6. This plate is secured to the lower face of a housing 7 in which the operating mechanism for the shaft 4 is mounted.

The chuck 1 faces downwardly to receive the drum thereon from below upon said drum being lifted from an assembly line conveyor by an elevating mechanism, both of which are preferably generally the same as that shown in said Patent No. 2,901,085. The chuck 1 is formed on top with an outwardly projecting movement-limiting flange 8, while its vertical peripheral edge slopes or curves inwardly, as shown at 9, in order to aid in the centralizing of the drum onto the chuck as said drum moves upwardly; the chuck engaging in the drum with a close driving fit.

Supported from the plate 6—at opposite ends of the chuck relative to the direction of movement of the drums by the conveyor—are corresponding drum and seam engaging and control units, each indicated generally at 10. As both of said control units 10 are alike, a description of one will suffice for both.

Each unit 10 comprises a mounting block 11 which is secured to the underside of the plate 6 in any suitable manner. Projecting outwardly from one end of the block 11 and rigid therewith is an arm 12, while generally transversely spaced from or opposed to said arm 12 is another arm 13 which at its inner end is pivotally mounted in connection with the block 11 by means of a vertical pin 14. The pin 14 is supported in vertically spaced ears 15 formed with the block 11; the arm 13 projecting between said ears. An air cylinder 16 connects the outer ends of the arms 12 and 13; said cylinder constantly but yieldably tending to draw the arm 13 toward the arm 12.

Rigid with the arm 13 (which is immediately below the upper ear 15) and disposed between the arms 12 and 13, is a vertical sleeve 17 in which a vertical shaft 18 is journaled. Another arm 19, rigid with said sleeve, engages the pin 14 immediately below the lower ear 15. The sleeve 17, together with the arms 13 and 19, form a carrier for a rotatable wheel or circular roll 20; the latter being substantially alined with the chuck 1 so as to engage the upper portion of the drum 2 when the latter is received on said chuck and is abutted against the flange 8 as shown in FIG. 1.

The roll 20 is of relatively small size as compared with the chuck 1, and the rolls of the two control units 10 are disposed so as to be in alinement diametrically of the chuck 1.

Turnable on the vertical pin 14 between the arm 13 and the lower ear 15 is the hub 21 of a switch carrying arm 22, which extends in substantially straddling relation to the sleeve 17 toward the arm 12. The outer end portion 23 of the arm 22 is disposed in a plane at right angles to a line radially of the sleeve 17 and is engaged by a friction clamp mounted on the arm 12 and indicated generally at 24.

The friction clam 24 comprises a top plate 25 and a bottom plate 26; the top plate being secured to the arm 12 on the underside thereof. The plates 25 and 26—at their outer ends—are formed with lips 27 facing each other and engaging the end of the arm portion 23 in relatively slidable but gripping relation. Back from the lips a short distance, the plates 25 and 26 are connected by bolts 28, and springs 29 on such bolts act to yieldably press the lips toward each other. Adjacent their rear ends the plates 25 and 26 are rockably supported on a cross pin 30 as shown in FIG. 4.

A bracket finger 31 projects from the sleeve 17 radially thereof substantially at right angles to the arm portion 23 and extends into a somewhat elongated notch 32 in the adjacent face of the arm portion 23. Outwardly or short of the notch 32, the bracket finger 31 is provided with a laterally projecting pin 33 disposed at right angles to said finger on the side thereof opposite the clamp 24 and adapted to engage and depress the closing nub 34 of a micro switch, indicated at 35, and which is mounted in a housing 36 secured on the adjacent portion of the arm 22.

The micro switch 35, which is normally open as indicated in FIG. 5, is interposed in a circuit 37 which controls the actuation of a clutch and magnetic brake unit 38 of a conventional type. This unit is interposed between the shaft 4 and the shaft 4a of a constantly driven motor 39 and is arranged so that when the circuit 37 is open, the clutch is engaged and the chuck 1 will be rotated. When, however, the switch 35 is closed and the circuit 37 energized, the clutch will be disengaged and the brake simultaneously applied to the shaft 4, stopping the rotation of the chuck 1.

In the operation of the above described seam locating device—after the drum 2 is elevated and initially engaged with the chuck 1, and with the seam 3 located somewhere circumferentially intermediate the rolls 20—the latter pressing engage and ride the outer wall of the drum adjacent the top thereof. At such time the finger 31 engages the end of the notch 32 closest to the clamp 24, and in so doing swings the arm 22 about the pin 14 so that the end of the arm portion 23 projects well into the friction clamp 24, as shown in FIG. 2.

When the drum seam 3—with the rotation of the drum—reaches the roll 20 and continues to move circumferentially with the chuck, said seam pushes the roll 20 away from the drum and chuck. This causes the roll carrier, which includes the sleeve 17, to be turned about the pin 14; this swinging the finger 31 away from the clamp 24 and toward the switch housing 36. By the time the seam is in a centralized position between the roll 20 and the chuck 1, the finger 31 will have been swung a sufficient distance to cause the pin 33 to engage and depress the nub 34, as shown in FIG. 3, so as to close the micro switch 35.

As previously explained, such closing of switch 35 causes the drive of the chuck 1 to be discontinued, and the rotation of the same to be immediately braked so that the seam 3 will not move any further and is definitely located in the position described. Thus, when the drum is lowered from engagement with the chuck 1 and returned to the conveyor and moved along the same, the seam will remain out of the way of further operations to be performed on the drum.

As soon as the drum lowers and its seam 3 is withdrawn from between the roll 20 and the chuck 1, the air pressure in the cylinder 16 acts to swing the sleeve 17 and the roll 20 toward the chuck 1 so that said roll again contacts said chuck. At the same time, the finger 31 will be swung in a direction to open the switch, and to again push the arm portion 23 into the clamp 24 to its initial position, should it have been moved out of such position by the previously described switch closing action.

The arm 22, on which the switch is mounted, is made movable instead of being stationary in order that the present device will be suitable for use with different thicknesses of seams (which require different amounts of movement of the switch actuating finger 31 and pin 33) without possible damage being done to some part of the control unit.

Further, each control unit 10 is designed so that a radially thin or normal seam will cause closing of the switch 35 without any movement of the arm 22 being involved; a seam of any more thickness causing a correspondingly greater swinging movement of the roll carrier such as will cause the finger 31 to push against the end of the notch 32 nearest the switch housing 36 so that the arm 22 will be moved with the carrier and finger once the nub 34 is depressed and the switch actuated. As previously described, the finger later acting against the other end of the notch will return the arm 22 and the switch to their original position when the roll 20 returns to its drum engaging position. The notch 32 thus forms a lost-motion connection between the carrier and the arm 22.

A pair of the control units 10, each functioning independently of the other, is used in order to cause the drum seam to be located in the desired position—relative to direction of travel along the conveyor—with a rotation of the drum no greater than 180 degrees from the position occupied by said seam when the drum is initially placed on the chuck 1.

It should be observed that while this specification and the appended claims refer to the seamed member as being a "drum," this term is intended to included cylindrical metal bodies generally and such as are formed with a seam down the side.

From the foregoing description, it will be readily seen that there has been produced such a seam locating device for metal drums as substantially fulfills the objects of the invention, as set forth herein.

While this specification sets forth in detail the present and preferred construction of the seam locating device for metal drums, still in practice such deviations from such detail may be resorted to as do not form a departure from the spirit of the invention, as defined by the appended claims.

Having thus described the invention, the following is claimed as new and useful and upon which Letters Patent is desired:

1. A drum seam locating apparatus comprising a circular chuck adapted to fit in driving relation into one end of a drum having a longitudinal exterior seam, a power device to drive the chuck, electrically released connection means between the device and chuck, a circuit for said connection means, the circuit when closed causing the chuck to be immediately halted, a normally open switch in the circuit, a control unit mounted adjacent the chuck and including a rotatable roll normally riding a chuck engaged rotating drum, the axis of the roll being parallel to that of the chuck, the control unit including a fixed mounting block, a roll supporting carrier pivoted on the block in spaced relation to the pivot of the roll and arranged so that when the seam passes between the chuck and roll the carrier will be swung away from the chuck, a member provided with the unit and on which member the switch is mounted, an element mounted on the carrier and projecting therefrom for engagement with the switch to close the same when the carrier is so swung, means mounting the member for movement toward and from the element, friction means tending to restrain such movement, and means between the carrier and the member to return the latter to its initial position subsequent to any movement thereof caused by a switch engaging movement of the element and upon return of the roll to a drum riding position.

2. A drum seam locating apparatus comprising a circular chuck adapted to fit in driving relation into one end of a drum having a longitudinal exterior seam, a power device to drive the chuck, electrically released connection means between the device and chuck, a circuit for said connection means, the circuit when closed causing the chuck to be immediately halted, a normally open switch in the circuit, a control unit mounted adjacent the chuck and including a rotatable roll normally riding a chuck engaged rotating drum, the axis of the roll being parallel to that of the chuck, the control unit including a fixed mounting block, a roll supporting carrier pivoted on the block in spaced relation to the pivot of the roll and arranged so that when the seam passes between the chuck and roll the carrier will be swung away from the chuck, a finger projecting from the carrier substantially radially of the pivot thereof, an arm pivoted concentric with and independently of the carrier and including a portion generally parallel to and to one side of the finger and another portion disposed at right angles to the finger mainly beyond and on the same level as the finger, the switch being mounted on the first named arm portion in facing relation to the finger, an element projecting from the finger toward the switch for closing the same, the other arm portion having an elongated notch facing and into which the end of the finger projects to allow of a predetermined amount of movement of the finger relative to said other arm portion, and a friction clamp mounted in a fixed position in connection with the mounting block and engaging the end of said other arm portion beyond the notch.

3. A drum seam locating apparatus comprising a circular chuck adapted to fit in driving relation into one end of a drum having a longitudinal exterior seam, a power device to drive the chuck, electrically released connection means between the device and chuck, a circuit for said connection means, the circuit when closed causing the chuck to be immediately halted, a normally open switch in the circuit, a control unit mounted adjacent the chuck and including a rotatable roll normally riding a chuck engaged rotating drum, the axis of the roll being parallel to that of the chuck, the control unit including a fixed mounting block, a roll supporting carrier pivoted on the block in spaced relation to the pivot of the roll and arranged so that when the seam passes between the chuck and roll the carrier will be swung away from the chuck, a finger projecting from the carrier substantially radially of the pivot thereof, an arm pivoted concentric with and independently of the carrier and including a portion generally parallel to and to one side of the finger, the switch being mounted on said arm portion in facing relation to the finger, an element projecting from the finger toward the switch for closing the same upon predetermined swinging movement of the carrier relative to said arm, a friction clamp mounted on the block engaging the arm and tending to restrain the movement of the same about its pivot, and means between the finger and arm to swing the latter in a direction away from the finger with an extent of movement of the carrier greater than necessary to close the switch and to swing the arm in the opposite direction to its initial position upon the roll returning to its drum riding position.

4. A drum seam locating apparatus comprising a circular chuck adapted to fit in driving relation into one end of a drum having a longitudinal exterior seam, a power device to drive the chuck, electrically released connection means between the device and chuck, a circuit for said connection means, the circuit when closed causing the chuck to be immediately halted, a normally open switch in the circuit, a control unit mounted adjacent the chuck and including a rotatable roll normally riding a chuck engaged rotating drum, the axis of the roll being parallel to that of the chuck, the control unit including a fixed mounting block, a roll supporting carrier pivoted on the block in spaced relation to the pivot of the roll and arranged so that when the seam passes between the chuck and roll the carrier will be swung away from the chuck, a member provided with the unit and on which member the switch is mounted, an element mounted on the carrier and projecting therefrom for engagement with the switch to close the same when the carrier is so swung, means mounting the member for swinging movement, and means to swing the member in the same direction as the carrier upon movement of the switch engaging element a distance greater than required to actuate the switch, and to return the member to its initial position upon the carrier being swung to its corresponding position.

5. An apparatus, as in claim 4, in which the last named means comprises a lost-motion connection between the carrier and member.

References Cited by the Examiner

UNITED STATES PATENTS

| | | |
|---|---|---|
| 1,735,136 | 11/1929 | Shoenberger. |
| 1,743,018 | 1/1930 | Magnusson et al. _____ 198—33 |
| 2,247,602 | 6/1941 | Carroll _____ 198—33 |
| 2,613,634 | 10/1952 | Johns et al. _____ 214—340 |
| 2,889,028 | 6/1959 | Booklund _____ 214—1 X |

MARVIN A. CHAMPION, *Primary Examiner.*